US005685659A

United States Patent [19]

Brosius et al.

[11] Patent Number: 5,685,659

[45] Date of Patent: Nov. 11, 1997

[54] PIVOT FOR ARTICULATING THE LOAD-BEARING COMPONENTS OF A JACK

[75] Inventors: Peter Brosius, Ayl; Reinhard Hölscher, Salzkotten, both of Germany

[73] Assignee: August Bilstein GmbH & Co. KG, Ennepetal, Germany

[21] Appl. No.: 769,577

[22] Filed: Dec. 19, 1996

Related U.S. Application Data

[63] Continuation of Ser. No. 571,696, Dec. 13, 1995, abandoned, which is a continuation of Ser. No. 208,006, Mar. 8, 1994, abandoned.

[30] Foreign Application Priority Data

Mar. 20, 1993 [DE] Germany ........................ 43 09 022.2

[51] Int. Cl.$^{6}$ ........................ F16C 11/00; B66F 3/22

[52] U.S. Cl. ........................ 403/65; 29/437; 29/512; 254/122; 254/126; 403/68; 403/153; 403/279; 16/386

[58] Field of Search ........................ 29/437, 512; 254/122, 254/126; 403/65, 66, 68, 153, 277, 279, 282; 16/386

[56] References Cited

U.S. PATENT DOCUMENTS

| | | | |
|---|---|---|---|
| 1,302,942 | 5/1919 | McMurray | 29/512 |
| 1,609,597 | 12/1926 | Arnt | 29/512 X |
| 2,233,351 | 2/1941 | Rowe | 29/437 |
| 2,406,940 | 9/1946 | Brill | 403/153 |
| 2,616,113 | 11/1952 | Scinta | 403/153 X |
| 4,055,329 | 10/1977 | Hammond | 254/86 R |
| 4,441,835 | 4/1984 | Davis | 403/24 |
| 4,485,544 | 12/1984 | Van Ryswyk | 16/386 X |
| 4,582,435 | 4/1986 | Davis | 384/129 |
| 4,936,079 | 6/1990 | Skalsky et al. | 53/219 |
| 5,076,149 | 12/1991 | Everts | 403/153 X |
| 5,339,510 | 8/1994 | Roth et al. | 29/437 X |
| 5,529,286 | 6/1996 | Kikuchi | 254/126 |

*Primary Examiner*—Anthony Knight
*Assistant Examiner*—Andrea Chop
*Attorney, Agent, or Firm*—Max Fogiel

[57] ABSTRACT

Pivot for articulating the load-bearing components of a jack. The pivot comprises a shaft that rotates in a bore. The components are lengths of U section or have lateral flanges or upright edges that overlap in the vicinity of the pivot. The object is to decrease the weight of the jack. Instead of a solid bolt, the axis is a hollow neck (19) stamped through the sides (15 & 17) or flanges (13) of one component and extending through the bore (18) in its counterpart.

6 Claims, 3 Drawing Sheets

PIVOT FOR ARTICULATING THE LOAD-BEARING COMPONENTS OF A JACK

This is a continuation of Ser. No. 08/571,696 filed Dec. 13, 1995, now abandoned, which is a continuation of Ser. No. 08/208,006 filed Mar. 8, 1994, now abandoned.

BACKGROUND OF THE INVENTION

The present invention concerns a pivot for articulating the load-bearing components of a jack. Many such load-bearing components are lengths of U section. Others, the supporting tray and foot for example, are made of sheet metal and have elevated upright flanges. The components are articulated by pivots that extend through holes bored in the overlapping elevated flanges on the top and foot and the sides of the section. German OS 2 231 526 describes such articulations in the form of pivots 13 and 14.

Lined bearings have also been employed at the pivots to enlarge the area of the bore and reduce surface-to-surface pressure as described in German GM 1 929 691.

One drawback to the pivots for articulating the load-bearing components of jacks is that, since they are usually solid bolts and weigh a lot, they constantly detract from the weight necessary for operating the vehicle.

SUMMARY OF THE INVENTION

The object of the present invention is accordingly intended to reduce the weight of known jacks.

This object is attained in accordance with the present invention in a generic pivot. It turns out to be of particular advantage that the elimination of unnecessary parts considerably simplifies manufacture of the jack. Preferred embodiments and advanced versions of the invention are recited in the dependent claims. The measures that can be taken prevent the pivots from coming apart when the jack is twisted. One embodiment of the invention decreases the pressure between the bore and the hollow shaft. Another embodiment decreases the friction and seizing.

BRIEF DESCRIPTION OF THE DRAWINGS

One embodiment of the invention will now be specified with reference to the drawing, wherein.

DESCRIPTION OF THE PREFERRED EMBODIMENTS

Figure 1:
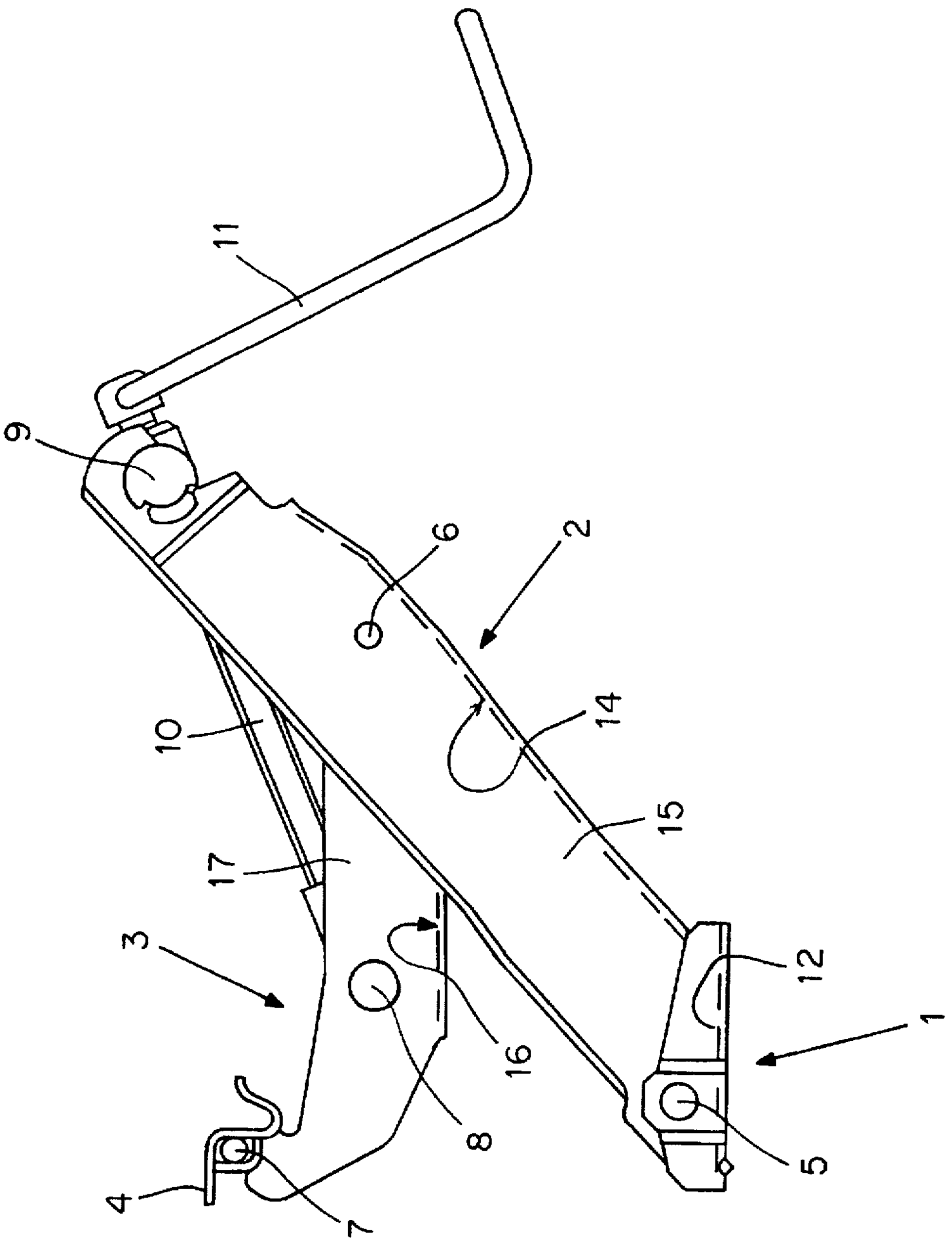
FIG. 1 is a side view of an articulated jack.

All jacks, of no matter what type, have pivoting load-bearing components that permit considerable freedom of motion between themselves and the foot. The pivoting components must be strong enough to bear the weight of the vehicle. The jack illustrated in FIG. 1 is only one type. The load-bearing components of the jack illustrated in FIG. 1 are a foot 1, an upright 2, an arm 3, and a tray 4. All these components are articulated together by pivots 5, 6, and 7.

Other pivots 8 and 9 attach a threaded shaft 10 to the upright and to the arm. Mounted on the shaft is a nut that allows arm 3 to pivot up in relation to upright 2. Shaft 10 is turned by a crank 11.

The foot 1 of the jack has a base 12 with upright lateral flanges 13. The upright is a length of U section comprising a base 14 and sides 15. The arm is also a length of section with a base 16 and sides 17. The pivot in accordance with the invention is appropriate for articulating arm 3 to upright 2 and upright 2 to foot 1 in the present embodiment. When appropriately designed it could also be employed to articulate tray 4 to arm 3. The pivot in accordance with the present invention is also appropriate for articulating sheets of metal to the aforesaid sides or flanges and for pivoting load-bearing components of sheet metal with and without reinforcing beads to jacks.

Figure 3:
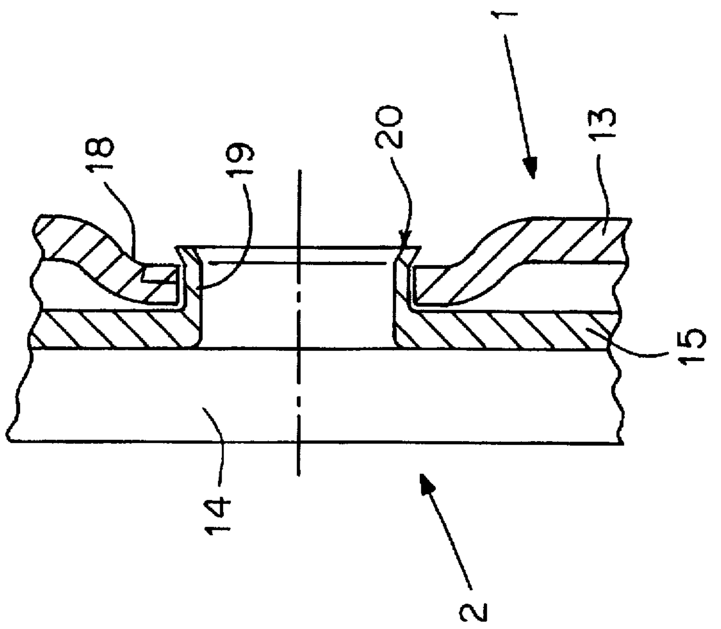
FIG. 3 is a similar detail illustrating the same articulation subsequent to assembly.
Figure 2:
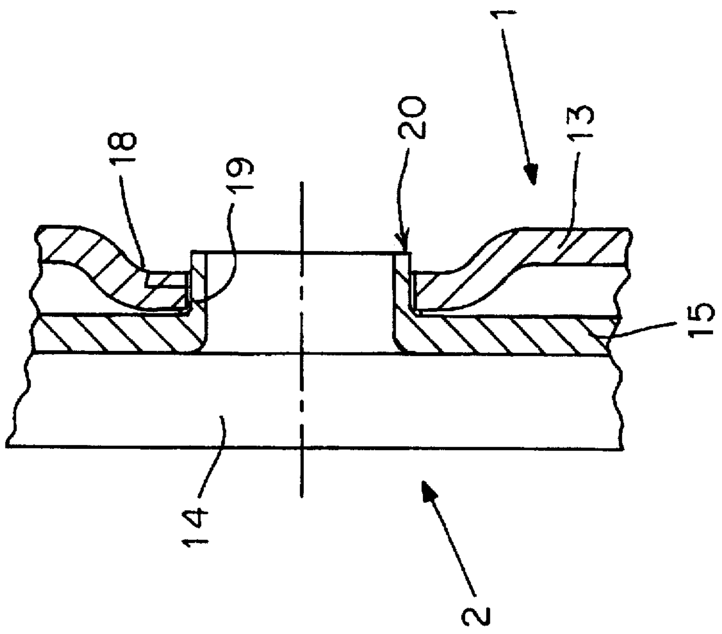
FIG. 2 is a larger-scale detail illustrating the articulation between the foot and the upright of the jack just prior to assembly.

FIGS. 2 and 3 illustrates details of the pivot that articulates foot 1 to upright 2. The flanges 13 on foot 1 include a conventional bore 18. The side 15 of upright 2 has a hollow neck 19 stamped through the vicinity of the pivot while the component is being stamped out. Since both foot 1 and upright 2 are essentially lengths of U section, assembly can be facilitated by bending the sides 15 of the upright toward each other and if necessary the sides 13 of the foot away from each other. The bend can be permanent or resilient depending on the material and how thick it is. Once neck 19 has snapped into bore 18, preliminary assembly can be carried out as illustrated in FIG. 2. There must of course be a similar neck on upright 2 and a similar bore in foot 1.

To prevent neck 19 from falling out of bore 18, the edge 20 of the neck that extends out through the bore can be expanded to make it wider than the bore. The result is an interlocking connection.

Neck edge 20 can be left open as illustrated or provided with a cap of any desired shape.

Figure 5:
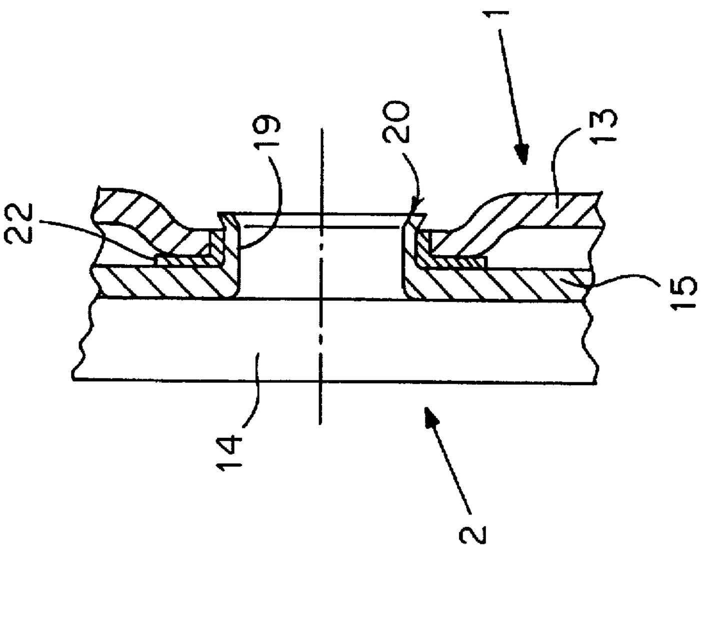
FIG. 5 is a cross-sectional view of another embodiment and shows a bushing between the bore and the neck of the construction according to the present invention.
Figure 4:
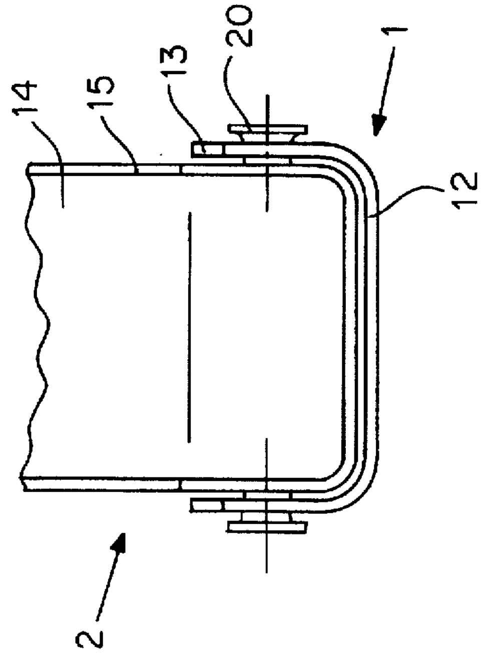
FIG. 4 is a partial view which shows the U-shape of the components of the jack.

The pivot may also be constructed with a bushing 22 between the bore 18 and the neck 19, as illustrated in FIG. 5.

The invention claimed is:

1. A jack having articulating load-bearing components comprising: a shaft rotating in a bore contained in an arm of said jack and connected to said components; said components being lengths of U-section overlapping adjacent said pivot, said lengths of U-section having sides; a hollow neck only stamped through sides of a first of said components and extending through a bore in a second of said components cooperating with the first of said components, said first U-section component lying inside said second U-section component, said pivot having a pivot point adjacent said first component and said second component; said first component and said second component having a U-shape in a region of said pivot point, said pivot being secure against collapse when said jack is under load; said first U-section component having two substantially parallel sides with a hollow neck at each side; said second U-section component having two substantially parallel sides with only a bore through each side, each hollow neck extending into the bore adjacent to the hollow neck, said first U-section component lying entirely inside said second U-section component.

2. A pivot as defined in claim 1, wherein said neck has an expanded edge that is wider than said bore in said second component.

3. A pivot as defined in claim 2, wherein said expanded edge is a clinched expanded edge.

4. A pivot as defined in claim 1, wherein at least a part of said bore in said second component is cylindrical.

5. A pivot as defined in claim 1, including a bushing between said bore in said second component and said neck in said first component.

6. A jack having articulating load-bearing components comprising: a shaft rotating in a bore contained in an arm of said jack and connected to said components; said components being lengths of U-section overlapping adjacent said pivot, said lengths of U-section having sides; a hollow neck only stamped through sides of a first of said components and extending through a bore in a second of said components cooperating with the first of said components, said first U-section component lying inside said second U-section component, said pivot having a pivot point adjacent said first component and said second component; said first component and said second component having a U-shape in a region of said pivot point, said pivot being secure against collapse when said jack is under load; said neck having an expanded edge that is wider than said bore in said second component, said expanded edge being a clinched expanded edge; at least a part of said bore in said second component being cylindrical; and a bushing between said bore in said second component and said neck; said first U-section component having two substantially parallel sides with a hollow neck at each side; said second U-section component having two substantially parallel sides with only a bore through each side, each hollow neck extending into the bore adjacent to the hollow neck, said first U-section component lying entirely inside said second U-section component.

* * * * *